United States Patent [19]

Ishii et al.

[11] 3,906,531
[45] Sept. 16, 1975

[54] SHUTTER SCREEN ASSEMBLY FOR A FOCAL PLANE SHUTTER

[75] Inventors: Haruo Ishii, Wako; Fumio Urano; Masahiro Kawasaki, both of Omiya; Toshio Mochizuki, Tokyo, all of Japan

[73] Assignee: Asahi Kogaku Kogyo Kabushiki Kaisha, Tokyo, Japan

[22] Filed: Mar. 18, 1974

[21] Appl. No.: 451,826

[30] Foreign Application Priority Data

Mar. 26, 1973 Japan.................................. 48-36546

[52] U.S. Cl. ................. 354/242; 354/241; 354/243; 354/244
[51] Int. Cl.² .......................................... G03B 9/34

[58] Field of Search ............ 354/241, 244, 242, 243

[56] References Cited
UNITED STATES PATENTS
2,911,896  11/1959  Nieuwenhoven .................... 354/243

*Primary Examiner*—Samuel S. Matthews
*Assistant Examiner*—Russell E. Adams, Jr.
*Attorney, Agent, or Firm*—Christie, Parker & Hale

[57] ABSTRACT

A shutter screen assembly is provided for a focal plane shutter of the type having front and rear movable screens and respective link strings forming parts of an arrangement for moving the screens. The assembly is relatively easily constructed by virtue of an improved connection between each screen and its link string.

1 Claim, 4 Drawing Figures

PATENTED SEP 16 1975

3,906,531

SHUTTER SCREEN ASSEMBLY FOR A FOCAL PLANE SHUTTER

BACKGROUND OF THE INVENTION

This invention relates to focal plane shutters for cameras and is directed chiefly to the connection between a link string and the forward edge of a front or rear screen of a focal plane shutter.

In a conventional focal plane shutter, the forward edge of a front or rear screen is connected with link strings or ribbons by way of a pole. More specifically, a shutter screen is fixedly connected to a pole by winding its forward end round the center portion of the pole and a pair of link strings or ribbons are fastened to the ends of the pole so that the shutter screen is tensionally stretched between the winding and rewinding drums. With this method, the link strings or ribbons and shutter screen have to be connected separately to the pole, which makes the assembly work complicated.

SUMMARY OF THE INVENTION

The shutter screen assembly of this invention provides an arrangement that is relatively easy to construct, there being no need to fasten the link string ends separately as described above. Moreover, the invention provides a rugged and durable shutter screen assembly.

The shutter screen assembly includes front and rear relatively movable shutter screens having ends folded back to form spaces or tubular passages. Shutter drive means are provided, including a pair of link strings, for causing the screens to move. Each link string has a portion thereof extending through a respective one of the formed spaces. So as to hold the respective link strings and folded edges tightly together, there are provided a pair of elongated, double-folded metallic clamp members each being pressedly collapsed around a respective folded edge.

Preferably, each shutter screen is made of a very thin metal film with a thickness of about 0.04mm and the link string that is used is tetrone twisted string having a diameter in the order of 0.4mm. The forward edge of each shutter screen is folded back about 3mm long in the preferred embodiment. Preferably, the double-folded clamp member is made of a stainless steel plate of about 0.15mm thickness. When the clamp member is pressedly collapsed, a tight connection is effected. The foregoing method simplifies the manufacturing process and provides a rugged focal plane shutter.

DETAILED DESCRIPTION

Figure 1:
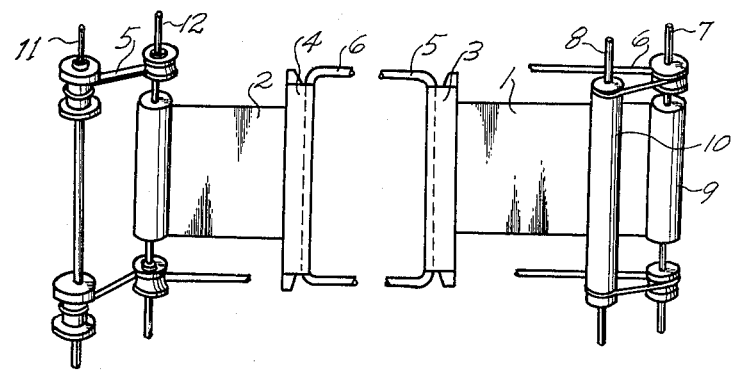
FIG. 1 is a partially broken front view of a focal plane shutter screen assembly embodying this invention.
Figure 2:
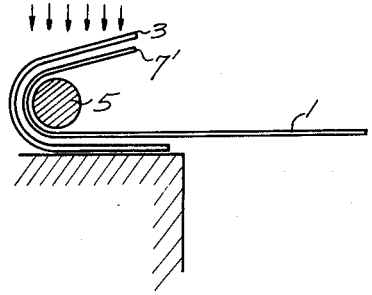
FIG. 2 is an enlarged sectional view showing the manner in which the forward edge of a shutter screen can be fastened.
Figure 4:
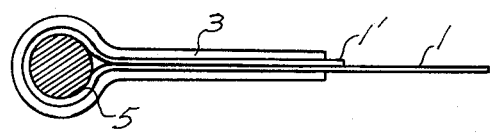
FIG. 4 is an enlarged sectional view illustrating a shutter screen in a completely fastened position.

In FIG. 1, indicated at 1 is a shutter front screen and at 2 is a shutter rear screen, each of which is made of a very thin metal film. Reference numerals 3 and 4 designate members for clamping the front screen edge and rear screen edge, respectively. As is seen from FIG. 2 the forward edge 1' (or 2') of the front screen 1 (or rear screen 2) is folded back so that a space is formed in the folded screen portion. A link string 5 (or 6) is inserted in said space and a clamp member 3 (or 4) is put around the folded screen portion. When the clamp member 3 (or 4) is collapsed into its double-folded shape by applying a pressure as shown by arrows, it fastens the folded edge of the screen and the link string together as shown in FIG. 4.

FIG. 1 also illustrates pertinent elements of that portion of the assembly providing for causing the screens to move.

Prior to charging the shutter, the edge of the front screen is located to the right of the figure and the front screen is wound up around a drum 9. The front screen link string 5 thereby has parallel legs (partially broken away) extending to the left where each bends around a pulley on a shaft 12 that defines the axis for this rear screen drum and terminates at a connecting point on a winding shaft 11. The rear screen, on the other hand, is in a position with its edge to the right of the figure and is thereby unwound off of its drum. The rear screen link string 6 thereby has parallel legs (partially broken away) extending to the right where each bends around a pulley on a shaft 7 that defines the axis for the drum 9 and terminates at a connecting point on a shaft 10.

During the charging of the shutter there are winding operations such as winding up the film (not shown). The winding shaft 11 turns so that link string 5 winds up on it and, as a result, the front screen is pulled to the left as it unwinds off of the drum 9. In the course of the movement of the front screen to the left, its leftmost edge eventually overlaps the rightmost edge of the rear screen, and thereafter the winding shaft 12 begins to turn. The turning action of the winding shaft 12 causes the rear screen to wind up around its drum. Thus, with the shutter charged and ready for release, the two screens are positioned so that their overlapping edges are to the left. When the shutter is released, the drum 9 begins to wind up the front screen, and thereafter the shaft 10 begins to wind up the link string 6. The time delay between the start of movement of the front screen and the start of movement of the rear screen results in a slit being formed that moves from left-to-right, with the slit serving as an opening to admit light to expose the film.

Figure 3:
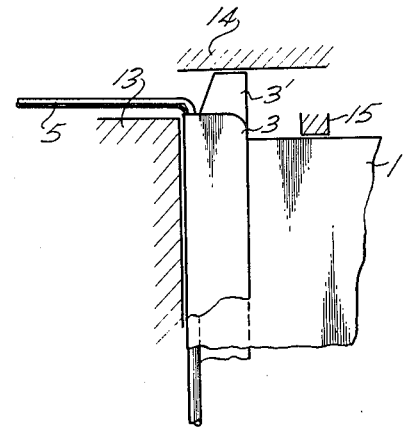
FIG. 3 is a view showing an arrangement of jigs that are advantageously used in fastening.

With reference to FIG. 3, a set of jigs 13, 14 and 15 (FIG. 3) may be used in constructing the assembly so as to precisely determine the relative position of the shutter screen and the clamp member. The clamp member 3 (or 4) is put in position by engaging its closed back portion with the jig 13 and engaging the projections 3' (or 4') formed on its longitudinal ends with the jig 14. On the other hand, the folded forward aend portion of the front screen 1 (or rear screen 2) which has the link string 5 (or 6) received therein is inserted in the clamp member 3 (or 4) and one lateral edge of the front screen 1 (or rear screen 2) is engaged with the jig 15. Under these conditions when a pressure is applied on the clamp member 3 (or 4) as shown by arrows (FIG. 2), the clamp member 3 (or 4) is collapsed to thereby fasten the link string 5 (or 6) and the folded edge portion 1' (or 2') together. It will be appreciated that once the relative position of the shutter screen, link string and clamp member has been determined by the help of jigs 13, 14 and 15, these elements can be fastened together by a single press operation.

According to this invention, there is avoided the aforementioned complicated connection process of the conventional method, wherein the forward edge of the shutter screen and the forward ends of a pair of link strings or ribbons have to be wound round a pole separately and that the shutter screen has to be held in position so that it is bonded to the pole at precisely right angles therewith. In contrast to the prior art arrangements, the link string according to this invention is continuous at the position where it is fastened. This avoids the danger that the link string slips out of the folded edge portion of the shutter screen. Furthermore, the use of the clamp member which is made of a steel plate or the like and gives a reliable fastening action can dispense with the use of any adhesive, thereby providing a shutter screen assembly which stands many years service.

What is claimed is:

1. In a focal plane shutter for a camera, a shutter screen assembly comprising front and rear relatively movable shutter screens having ends folded back to form tubular passages shutter drive means, including a pair of flexible link strings and means for winding and unwinding said strings, for causing movement of said screens; each of the link strings having a portion thereof extending through a respective one of said tubular passages and a pair of elongated metallic clamp members each being pressedly collapsed around a respective tubular passage so as to tightly hold the respective link strings and screens together.

* * * * *